United States Patent [19]

Takahashi et al.

[11] 4,416,008
[45] Nov. 15, 1983

[54] DUAL LOOP TYPE DATA HIGHWAY SYSTEM

[75] Inventors: Masahiro Takahashi; Takuji Hamada; Hitoshi Fushimi, all of Hitachi, Japan

[73] Assignee: Hitachi, Ltd., Tokyo, Japan

[21] Appl. No.: 215,842

[22] Filed: Dec. 12, 1980

[30] Foreign Application Priority Data

Dec. 20, 1979 [JP] Japan .................................. 54-164828

[51] Int. Cl.$^3$ .............................................. H04J 3/08
[52] U.S. Cl. ................................. 370/88; 179/18 EA; 370/29; 370/37
[58] Field of Search ....................... 370/88, 90, 37, 29; 179/18 EA

[56] References Cited

U.S. PATENT DOCUMENTS 3,652,798  3/1972  McNeilly et al. ...................... 370/88
3,732,374  5/1973  Rocher et al. ......................... 370/88

Primary Examiner—Glen R. Swann, III
Attorney, Agent, or Firm—Antonelli, Terry & Wands

[57] ABSTRACT

A dual loop type data highway system comprises a data highway having at least two loops for data transmission and reception, a plurality of data transmitting/receiving stations serially connected to the data highway and a control station serially connected to the data highway. The data transmitting/receiving stations each have means for detecting the beginning of a transmission cycle, one for each of the loops, and the control station has, one for each of the loops, means for detecting the end of the transmission cycle and means for permitting the transmission/reception of data between specified two of the data transmitting/receiving stations during the transmission cycle by polling, whereby an effective transmission rate is increased without considerable increase of hardware.

5 Claims, 11 Drawing Figures (a) POL FRAME (b) REQ, SEL, DATA, RESP FRAME (c) END FRAME

DUAL LOOP TYPE DATA HIGHWAY SYSTEM

BACKGROUND OF THE INVENTION

1. Field of the Invention

The present invention relates to a dual loop type data highway system, and more particularly to a dual loop type data highway system including dual loops, a plurality of data transmitting/receiving stations connected to those loops and a control station for permitting data transmission/reception between selected data transmitting/receiving stations by polling the data transmitting/receiving stations.

The data highway system is a loop transmission system commonly used in a production management and a calculation control in a variety of fields such as iron and steel industries and chemical plants.

2. Description of the Prior Art

A prior art data highway system has been constructed to include a single control station and a plurality of data transmitting/receiving stations connected in a loop so that a computer and terminal units are connected through the respective data transmitting/receiving stations. In such a data highway system, in order to increase the effective transmission rate, an optical fiber may be used as the transmission loop. In such a system, the control station and the data transmitting/receiving stations carry out various transmission controls by means of microprocessors. Thus, if the transmission rate exceeds 10–20 M bits per second for example, it will become unfeasible to carry out such processings. As a result, the transmission control has to be carried out by their own hardware and hence the amount of hardware at each of the data transmitting/receiving stations increases. In order to avoid such a problem, two loops may be provided and two data transmitting/receiving stations which carry out the transmission control are provided so that the entire loop is duplexed to increase the effective transmission rate. In this method, however, a considerable increase of the amount of hardware is unavoidable.

SUMMARY OF THE INVENTION

It is an object of the present invention to provide a novel dual loop type data highway system which increases the effective transmission rate without a considerable increase of the amount of hardware for the data transmitting/receiving station.

In accordance with the present invention, there is provided a dual loop type data highway system which comprises;

at least two loops for data transmission/reception;

a plurality of data transmitting/receiving stations connected to the loops; and a control station connected to the loops for permitting the data transmission/reception between selected data transmitting/receiving stations by polling the data transmitting/receiving stations, each of the data transmitting/receiving stations having first means for detecting the beginning of a transmission cycle, one for each of the loops, the control station having second means for detecting the end of the transmission cycle, one for each of the loops, the data transmitting/receiving stations and the control station each having means for selectively switching input/output data to one of the two loops, each of the data transmitting/receiving stations being switched into the selected loop on a condition that the data transmitting/receiving station is not in the process of data transmission and reception via the other loop at the time of the detection of the beginning of the transmission cycle, only the data transmitting/receiving station specified by the control station maintaining the connection with the loop to carry out the data transmission/reception while the other data transmitting/receiving stations release their connection so as to be ready for the start of a new transmission cycle.

DESCRIPTION OF THE PREFERRED EMBODIMENTS

For better understanding of the dual data highway system in accordance with the present invention, an outline of an arrangement of the data highway system is first explained with reference to FIG. 1 and an arrangement of a prior art dual loop type data highway system is explained with reference to FIG. 2.

Figure 1:
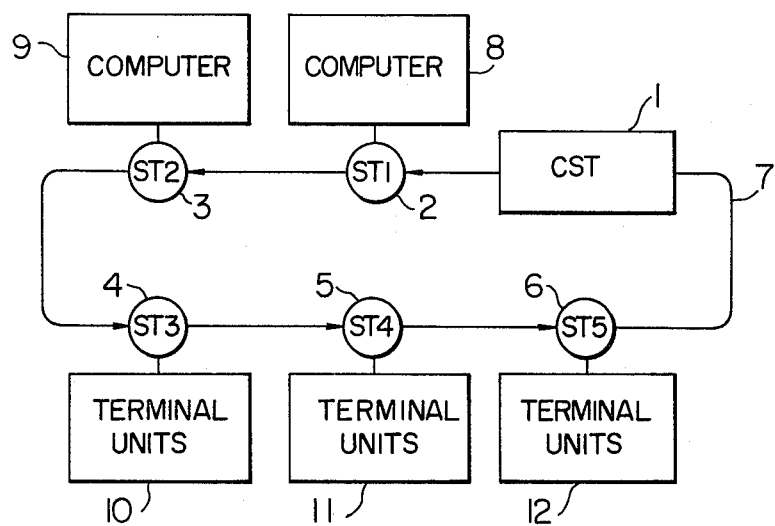
FIG. 1 is a block diagram for illustrating an arrangement of a data highway system.

Referring to FIG. 1, numeral 1 denotes a control station and numerals 2 to 6 denote data transmitting/receiving stations (ST1–ST5). The control station (CST) and the data transmitting/receiving stations (ST1–ST5) are connected by dual loops 7, and computers 8 and 9 are connected to terminal units 10, 11 and 12 through the data transmitting/receiving stations (ST1–ST5).

Figure 2:
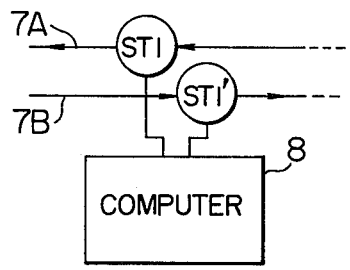
FIG. 2 is a block diagram for illustrating an arrangement of a prior art dual data highway system.

FIG. 2 shows an arrangement of data transmitting/receiving stations which are duplexed in accordance with a prior art system based on the data highway system shown in FIG. 1. In FIG. 2, a pair of loops 7A and 7B are connected to the computer 8 through data transmitting/receiving stations ST1 and ST1'. However, in the prior art dual loop type data highway system shown in FIG. 2, it is unavoidable that the amount of hardware of the respective data transmitting/receiving stations considerably increases.

The present invention provides a novel dual loop type data highway system which resolves the difficulties encountered in the prior art system.

The present invention will now be explained in detail with reference to the preferred embodiments thereof.

Figure 3:
FIG. 3 shows an arrangement of a transmission frame in accordance with the present invention.
Figure 3:
Figure 3:
Figure 4:
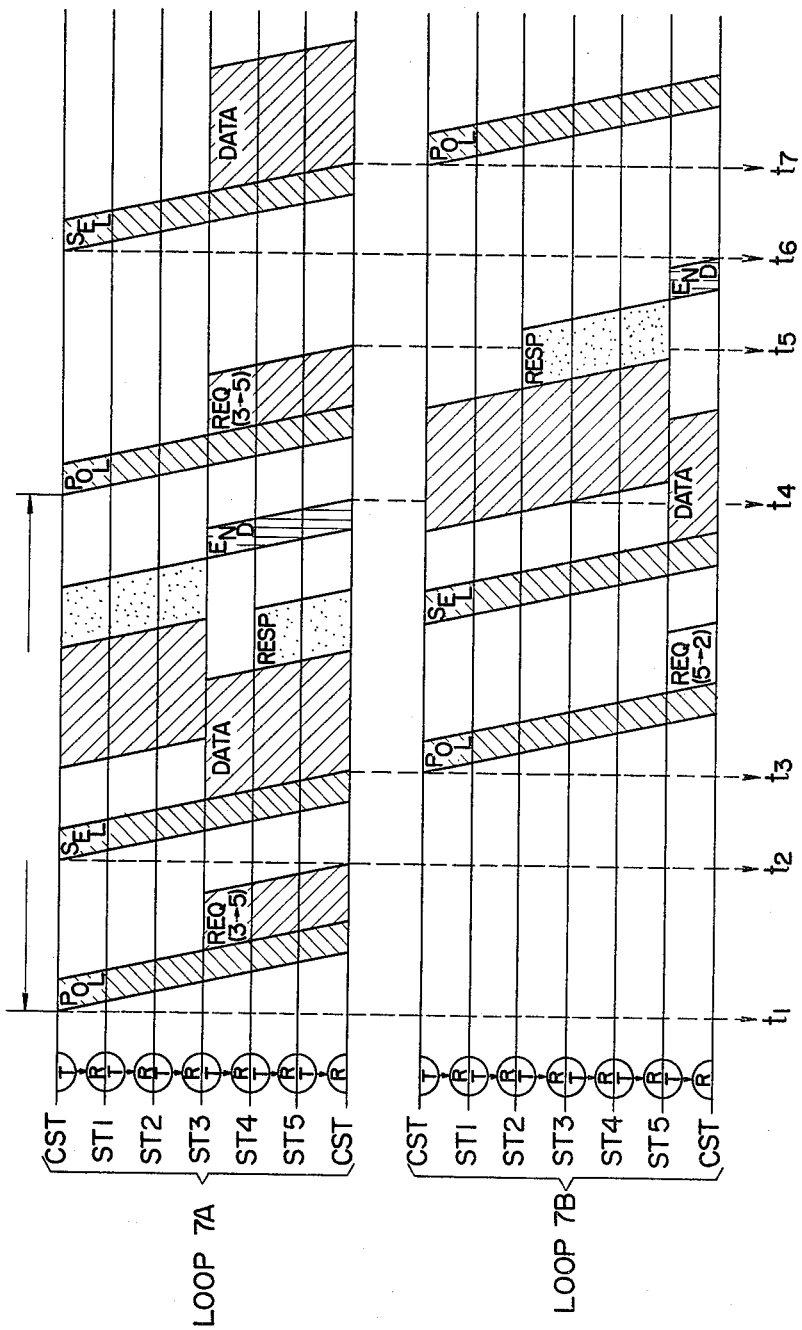
FIG. 4 is a time chart on a loop for illustrating a principle of the present invention.

FIG. 3 shows an arrangement of a transmission frame in accordance with the present invention, and FIG. 4 shows a time chart for illustrating a principle of the present invention.

In the transmission frame shown in FIG. 3, FIG. 3(a) shows a POL frame for inquiring as to a transmission request, that is, polling the data transmitting/receiving stations (ST1–ST5) from the control station (CST), FIG. 3(b) shows a transmission request REQ frame for requesting in response to the POL frame, a SEL frame for acknowledging the transmission of one of the data transmitting/receiving stations, that is, selecting that station in response to the transmission request, a DATA frame for transmitting data following the SEL frame, and a RESP frame for the data transmitting/receiving station having received the DATA frame to transmit a response, and FIG. 3(c) shows an END frame which indicates the end at which the data transmitting/receiving station having received the acknowledgement for transmission returns the transmission back to the control station (CST).

The POL frame comprises a synchronization code (GA) for initiating the transmission cycle and a priority control code (PC). The REQ frame, SEL frame, DATA frame and RESP frame are in accordance with the High-level Data Link Control (hereinafter abbreviated as HDLC) Procedure (e.g. International Standard 3309, Data Communication High-level Data Link Control Procedure Frame Structure), and it comprises an opening and a closing flag F for indicating the beginning and the end of the frame, a receiving station address DA, a control code C, a transmitting station address SA, data $I_1, I_2, \ldots I_n$, and an error control code FCS. The REQ frame, SEL frame and RESP frame can fully attain their purpose without data I. The END frame functions to terminate the transmission cycle and it may be a special pattern which does not occur in the POL frame, REQ frame, SEL frame or DATA frame. For example, it may be signals other than logical "1" or "0," or a string of sixteen or more "1's."

FIG. 4 shows a time chart for the loop control in accordance with the present invention in the frame configuration described above. In FIG. 4, the loops 7A and 7B are developed straight along an ordinate starting from the control station shown in FIG. 1 while an abscissa represents a length of time. One transmission cycle extends from the start of the transmission of the POL frame by the control station 1 to the start of the transmission of the next POL frame.

By the transmission of the POL frame to the loop 7A by the control station (at a point of time $t_1$), a transmission cycle is started. Each of the data transmitting/receiving stations is connected to the loop 7A by its own change-over operation in response to the detection of the GA code in the POL frame. The data transmitting/receiving station connected to that one of the computers 8 and 9 and the terminal units 10, 11 and 12, which is requesting the transmission of data, responds to the POL frame to transmit the priority control code PC and the data transmitting station address SA and the data receiving station address (as information $I_n$) together with the transmission request REQ frame. The control station, when it receives the POL frame and the REQ frame following that (at a point of time $t_2$), determines the presence or absence of the data transmitting/receiving station which has responded to the POL frame (in the illustrated example, there exists a transmission request from the data transmitting/receiving station ST3 to ST4), and if there is a response, the next step will be carried out but if there is no response, the polling will be retried.

When there exists a response to the POL frame, the control station can determine the data transmitting/receiving station by examining the content of the REQ frame. The control station determines if the data transmitting/receiving station associated with the data transmission/reception is transmitting or receiving data via the other loop, and if not, the control station transmits the SEL frame for specifying the transmitting/receiving stations (at a point of time $t_2$). The data transmitting/receiving station, when it receives the SEL frame, can determine if it has already been specified as the transmitting station or the receiving station. The transmitting station transmits the DATA frame while the receiving station transmits the RESP frame, and when the transmitting station receives the RESP frame it transmits the END frame to communicate the end of the transmission to the control station.

When the SEL frame has circulated through the loop (at a point of time $t_3$), the control station initiates the next new polling cycle via the loop 7B. The data transmitting/receiving stations other than those specified by the SEL frame via the loop 7A detect the GA code in the POL frame so that they are connected to the loop 7B by their own change-over operation and the next transmission cycle is carried out through the loop 7B.

The control station can detect the end of the transmission cycle by detecting the END frame from the loop, and when it detects the END frame (at a point of time $t_4$) it can initiate a new transmission cycle. FIG. 4 shows a case where the receiving station specified by the REQ frame is in operation of receiving data at the time of completion of the reception of the REQ frame (at a point of time $t_5$). After the END frame of the loop 7B has been detected (at a point of time $t_6$), the SEL frame is transmitted.

The constructions of the data transmitting/receiving stations and the control station for implementing the present invention are shown in FIGS. 5 through 9.

Figure 5:
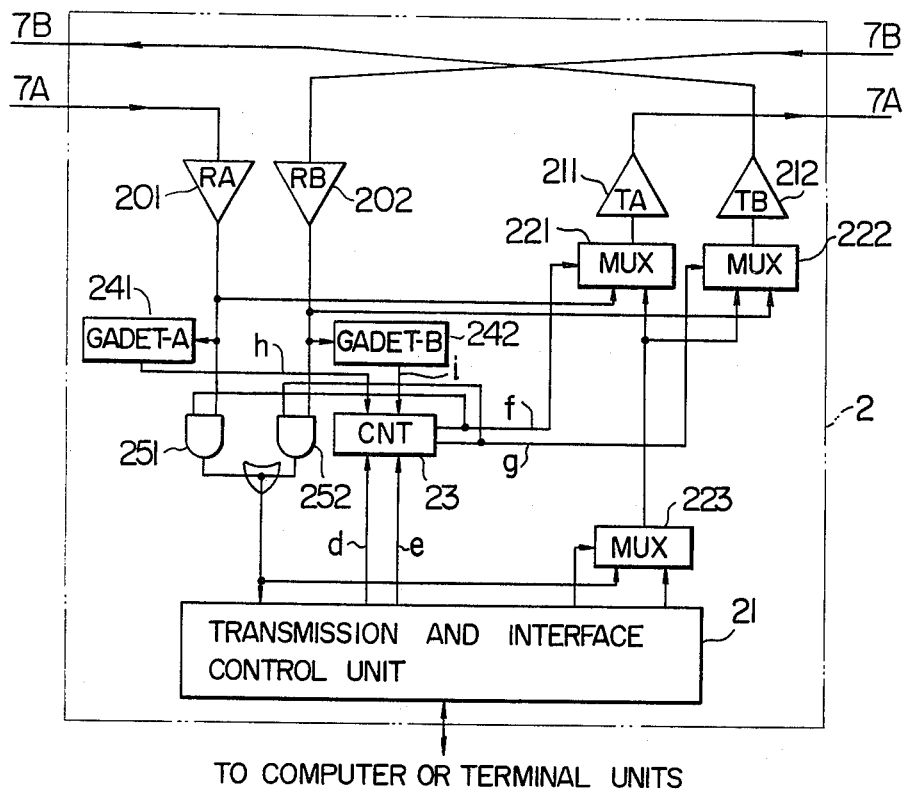
FIG. 5 is a block diagram for illustrating one embodiment of a data transmitting/receiving station in accordance with the present invention.

Referring to FIG. 5, data from the loops 7A and 7B are taken in through receivers 201 and 202 and one of the loops is selected by AND gates 251 and 252 which can be ORed by a wired OR circuit and the data is received at a transmission and interface control unit 21. Numerals 221, 222 and 223 denote multiplexing circuits each of which selects one of two input signals in response to a control signal. Numeral 23 denotes a multiplexing control circuit which controls the multiplexing circuits 221 and 222 and AND gates 251 and 252. Numerals 241 and 242 denote detectors for the GA code each of which detects the reception of the GA code on the loop 7A or 7B. Numerals 211 and 212 denote transmitters for sending data on the loops 7A and 7B, respectively. Numeral 21 denotes a transmission and interface control unit, the detail of which will be described with reference to FIG. 7. The arrangement thus described performs the transmission/reception of the frames shown in FIG. 3 and the interface function to the computers and the terminal units.

Figure 6:
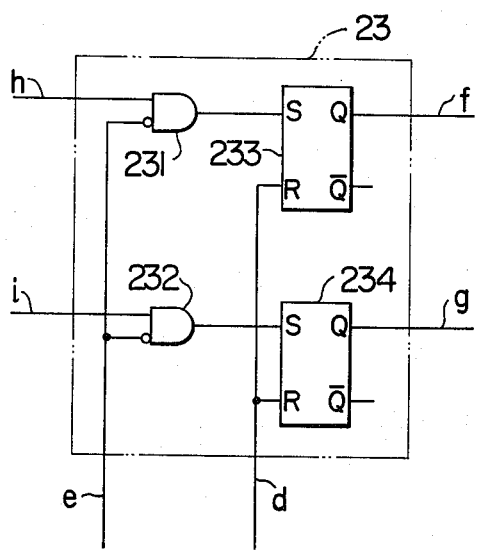
FIG. 6 shows a circuit diagram of a multiplexing control circuit shown in FIG. 5.

FIG. 6 shows a specific construction of the multiplexing control circuit 23. Numerals 231 and 232 denote AND gates and numerals 233 and 244 denote flip-flops.

Figure 8:
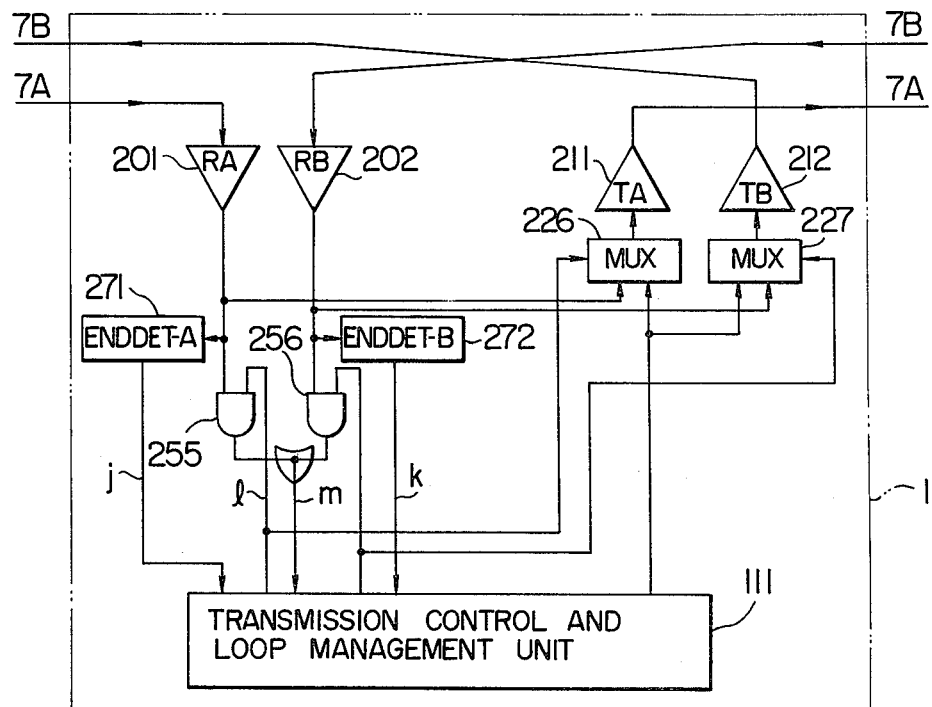
FIG. 8 is a block diagram for illustrating one embodiment of a control station in accordance with the present invention.

Referring to FIG. 8, those elements having the same numerals as those shown in FIG. 5 have the same functions. Numerals 271 and 272 denote END code detectors which detect the end of the transmission cycle. Numeral 111 denotes a transmission control and loop management unit which performs the transmission/reception of the frames shown in FIG. 3 and manages the loops.

Figure 7:
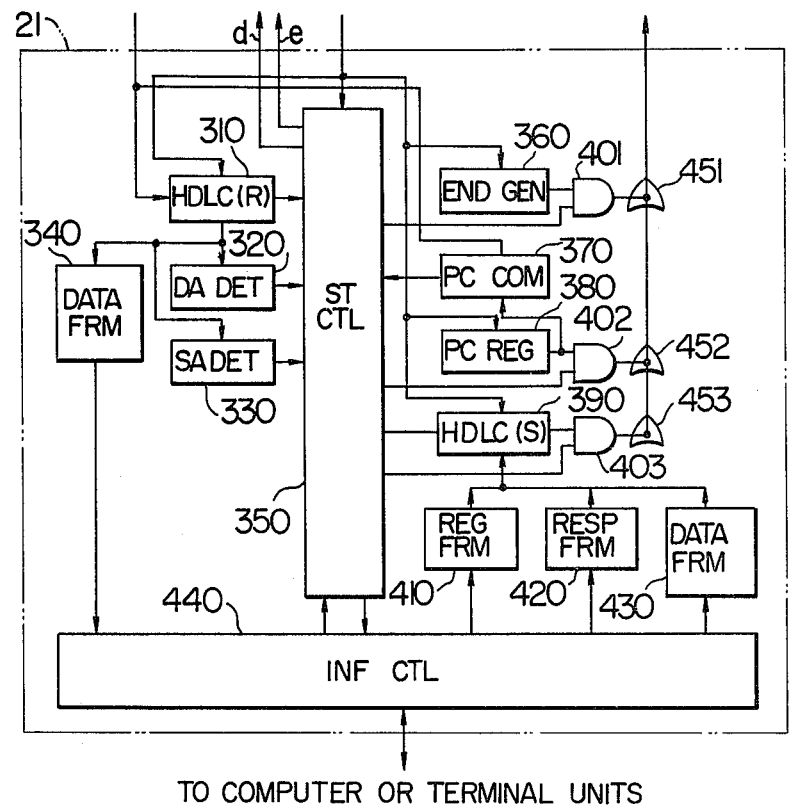
FIG. 7 is a block diagram for illustrating a construction of a transmission and interface control unit shown in FIG. 5.
Figure 9:
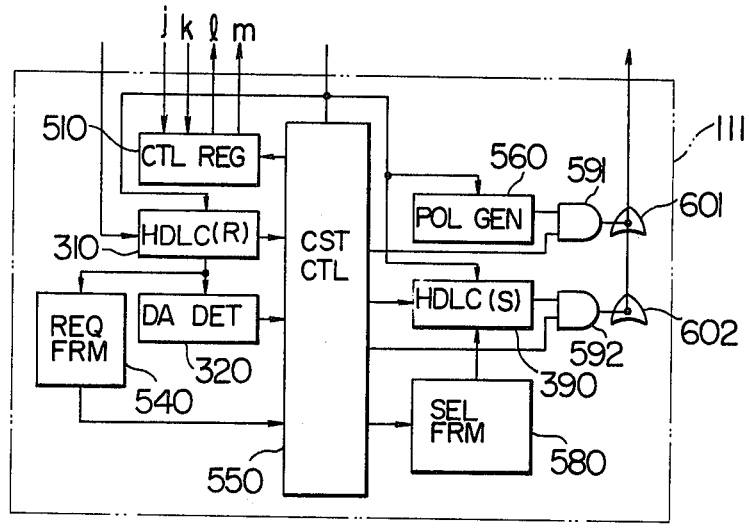
FIG. 9 is a block diagram for illustrating a construction of a transmission control and loop management unit shown in FIG. 8.

FIGS. 7 and 9 show the details of the transmission and interface control unit 21 and the transmission control and loop management unit 111, respectively.

Referring to FIG. 9, an HDLC receiver 310 has a function to decompose the frame format of the HDLC procedure shown in FIG. 2, and it detects the opening or beginning flag F to convert the information to 8-bit parallel data and performs the zero elimination and the error detection. The information converted to the 8-bit parallel data is applied to a DA detector 320 and a receiver memory 540 and stored therein. The DA detector 320 detects the frame forwarded to the control station. Actually, it detects if the received frame is the transmission request REQ frame. Numeral 550 denotes a CST control circuit which controls the detectors and the HDLC transmission/receiver. It may comprise a microprocessor and a memory which are conventional ones and need not be explained in detail.

A POL frame generator 560 generates the POL frame and an HDLC transmitter 390 generates the HDLC frame format shown in FIG. 2. It performs the addition of the beginning and end cycles, the zero insertion and the addition of the FCS bit for error control, and converts the parallel data to serial data. Numeral 580 denotes a transmitter memory which stores the content of the SEL frame. Gates 591 and 592 are control gates which can be ORed by a wired OR circuit and select either the POL signal or the data under the control of the CST control circuit 550. Numeral 510 denotes a control register to which the CST control circuit 550 writes and reads the control signals. Numerals 601 and 602 indicate the wired OR function.

Referring to FIG. 7, an SA detector 330 detects a transmitting station address SA in the HDLC frame and it functions to detect the frame transmitted from the control station, that is, the SEL frame. Numeral 340 denotes a receiver memory which stores the received DATA frame. Numeral 350 denotes an ST control circuit which controls the detectors and the HDLC transmitter/receiver. An END generator 360 generates the END pattern. A PC comparator 370 compares the content of a PC register with the received data bit by bit, and if the content of the PC register 380 is larger, it will inform this to the ST control circuit 350. The PC register is set with a priority level when the data transmitting/receiving stations request the transmission. The priority control selects one of a number of data transmitting/receiving stations requesting the transmission in accordance with a predetermined priority level. The priority control has been implemented in several ways such as that disclosed in the Japanese patent application entitled "Data Freeway Priority Control System" (Japanese Laid-Open Patent Application No. 115439/75).

Numerals 410 to 430 denote transmitter memories. The memory 410 stores the transmission request REQ frame, the memory 420 stores the response RESP frame and the memory 430 stores the transmitted data, that is, the content of the DATA frame. Numeral 440 denotes an interface control circuit for the computers or the terminal units connected to the data transmitting/receiving stations.

Figure 10:
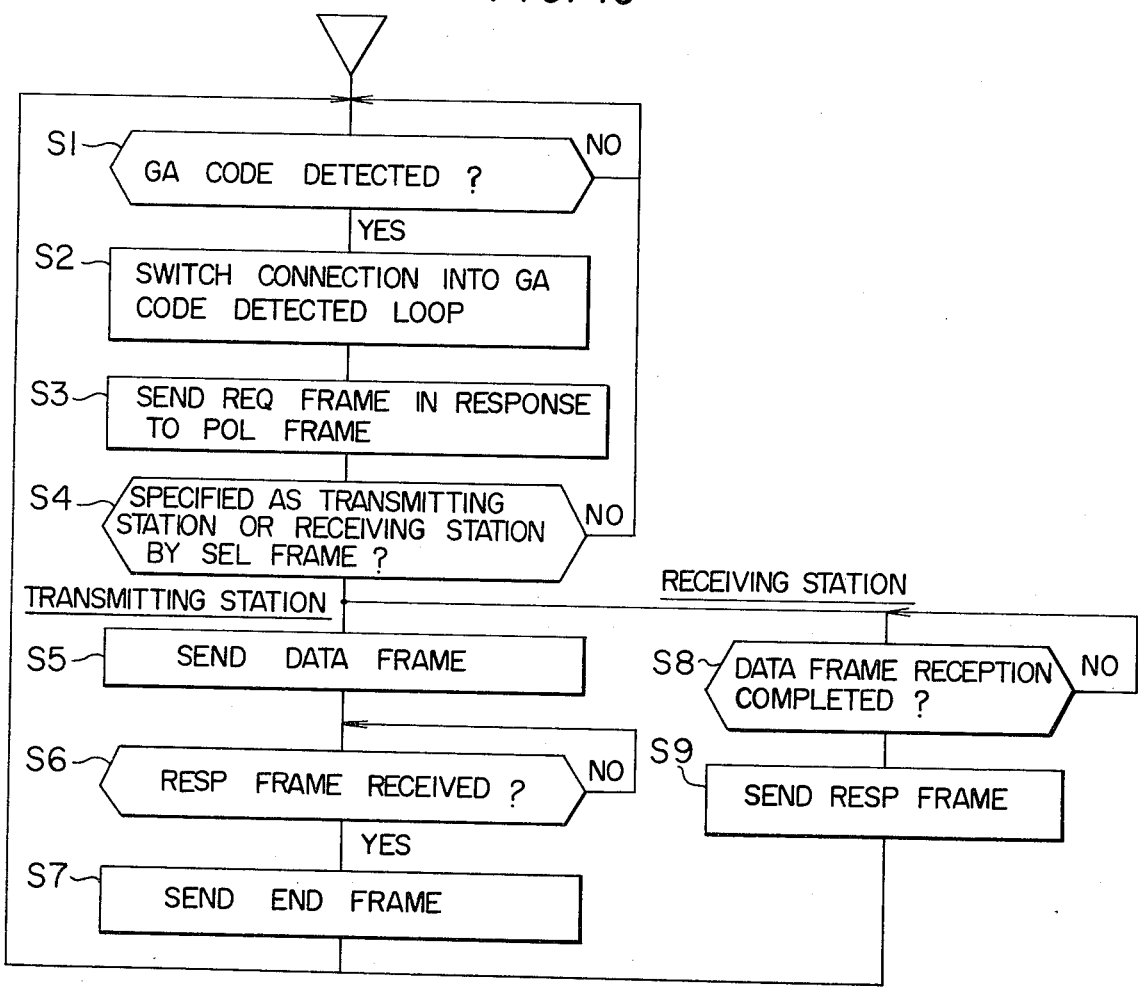
FIG. 10 shows a time chart for illustrating the operation of the data transmitting/receiving station.
Figure 11:
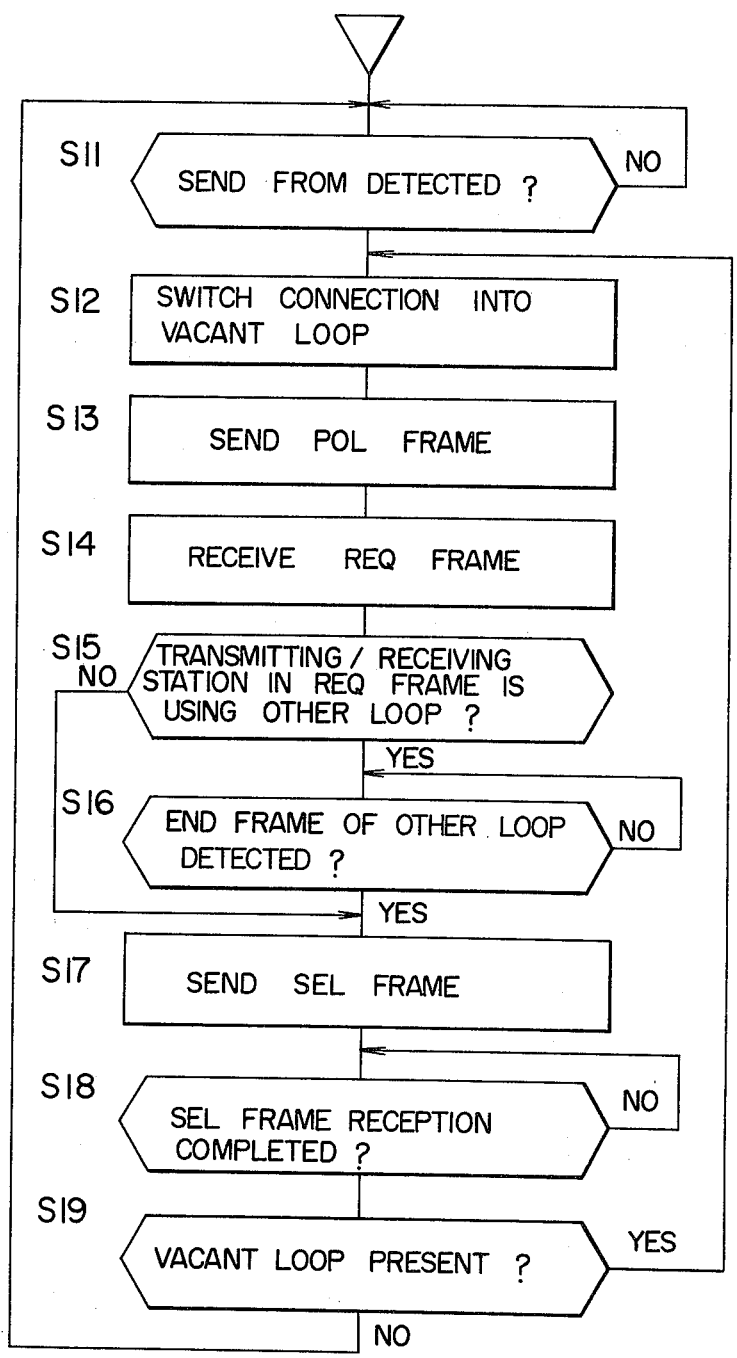
FIG. 11 shows a flow chart for illustrating the operation of the control station.

FIGS. 10 and 11 show flow charts of the operations of the data transmitting/receiving station and the control station, respectively. The operation of the data transmitting/receiving station is first explained with reference to FIGS. 5, 6, 7 and 10.

In the data transmitting/receiving station, the data from the loops 7A and 7B is passed through the receivers 201 and 202, the multiplexing circuits 221, 222, and the transmitters 211 and 212, and back to the loops. They do not pass through the transmission and interface control unit but bypass it. If the GA code appears on the loop 7A, for example, it is detected by the GA code detector 241 at the step ($S_1$) and a control signal h is produced. As is seen from FIG. 6, the flip-flop 233 is set by the control signal h and an output f of the flip-flop 233 controls the AND gate 251 and the multiplexing circuit 221 to switch the connection into the GA code detected loop at the step ($S_2$). Specifically, the data from the loop 7A is passed through the receiver 201 and the AND gate 251 to the transmission and interface control unit 21 which receives the data while sending out the data to the loop through the multiplexing circuits 223 and 221 and the transmitter 211.

In the transmission and interface control unit 21, the PC code of the POL frame is received following the GA code. When there exists a data transmission request and the received PC code is larger than that of its own, namely of high priority, the multiplexer 223 is controlled to transmit the REQ frame at the step ($S_3$). Then, it is determined if the station has been specified as the transmitting station or the receiving station by the SEL frame from the control station at the step ($S_4$). If it has not been specified as any of them, a control signal d is produced which, as seen from FIG. 6, resets the flip-flop 233 to the initial bypass state. If the station is specified as the transmitting station or the receiving station, a control signal e is produced which inhibits the flip-flop 234 being set by an output i of the GA code detector 242. The data transmitting/receiving station specified as the transmitting station transmits the DATA frame following the SEL frame under the control of the multiplexing circuit 223 at the step ($S_5$), and upon the reception of the RESP frame from the receiving station at the step ($S_6$), it sends the END frame at the step ($S_7$) to complete one transmission cycle. The data transmitting/receiving station specified as the receiving station, upon the reception of the DATA frame at the step ($S_8$), transmits the RESP frame at the step ($S_9$) and waits for the initiation of the next new transmission cycle. The flip-flop 233 is reset upon the completion of the transmission of the END frame in the transmitting station, and upon the completion of the transmission of the RESP frame in the receiving station. While the operation has been explained with respect to the loop 7A, the same is applicable to the loop 7B.

The operation of the control station is now explained with reference to FIGS. 8, 9 and 11. In the control station, the data from the loops 7A and 7B is normally routed through the receivers 201 and 202, the multiplexing circuits 226 and 227 and the transmitters 211 and 212 back to the loops. That is, the data is passed in the bypass mode. When the END code appears on the loop 7A, for example, the END code detector 271 detects the end of the transmission cycle at the step ($S_{11}$) and informs by a signal j to the transmission control and loop management unit 111 of the vacant state of the loop 7A. The transmission control and loop management unit 111 responds with a control signal l to control the AND gate 255 and the multiplexing circuit 226 to switch the connection into the vacant loop. Subsequently, the control station sends the POL frame ($S_{13}$) and receives the REQ frame which responded to the POL frame at the step ($S_{14}$). It determines if the transmitting/receiving station in the received REQ frame is using the other loop at the step ($S_{15}$), and if it is using it, the control station sends the SEL frame in response to the detection of the END frame from the other loop at the step ($S_{16}$). When the transmitted SEL frame is received after a complete circulation through the loop at the step ($S_{18}$), the role of the control station is completed and the vacant loop repeats the polling described above, or if the vacant loop is not present the detection of the END frame is watched at the step ($S_{19}$).

As is apparent from the description set forth above, according to the dual loop type data highway system of the present invention, the effective transmission rate is increased by the addition of simple hardware such as the receivers, transmitters, multiplexing circuits and GA and END code detectors and by sharing the transmission and interface control unit and the transmission control and loop management unit.

We claim:

1. A dual loop type data highway system comprising:
a data highway including at least two loops for data transmission and reception;
a plurality of data transmitting/receiving stations serially connected to said data highway; and
a control station serially connected to said data highway;
said data transmitting/receiving stations each having, for each of said loops, means for detecting the beginning of a transmission cycle,
said control station having, for each of said loops, means for detecting the end of the transmission cycle and means for permitting the transmission/reception of data between a specified two of said data transmitting/receiving stations on one of said two loops during the transmission cycle.

2. A dual loop type data highway system according to claim 1, wherein said transmission cycle comprises a polling frame, a request frame, a selection frame, a data frame, a response frame and an end frame, and wherein said data transmitting/receiving stations each include, for each of said loops, means for detecting said polling frame, means for switching the station into the loop from which said polling frame has been detected, means responsive to said polling frame for transmitting said request frame to said control station, means for detecting said selection frame to determine if the data transmitting/receiving station is assigned as a transmission station or a receiving station, means for sending said data frame when the station is assigned as the transmitting station, means for acknowledging the reception of said response frame when the station is assigned as the transmitting station, means for sending said end frame when the station is assigned as the transmitting station and all data has been transmitted, means for acknowledging the completion of the reception of said data frame when the station is assigned as the receiving station, and means for sending said response frame when the station is assigned as the receiving station.

3. A dual loop type data highway system according to claim 2, wherein said control station includes means for detecting said end frame, means responsive to said end frame for switching the station into a vacant loop of said data highway, means for sending said polling frame, means for detecting said request frame, means for determining if the transmitting/receiving station in said request frame is using the other loop of said data highway, means for sending said selection frame when said other loop is vacant, and means for determining the completion of the reception of said selection frame.

4. A dual loop type data highway system according to claim 2, wherein said polling frame comprises a GA code representative of the beginning of the transmission cycle and a PC code for priority control, said data transmitting/receiving stations each including means for sending out said request frame in accordance with the priority specified by said PC code.

5. A dual loop type data highway system according to claim 1, said control station including means for sending out on said data highway a polling frame for indicating the start of said transmission cycle and by means of which said control station inquires of said data transmitting/receiving stations as to the presence or absence of a request for sending; said transmitting/receiving stations including means for sending out on said data highway a request frame in response to receipt of said polling frame for requesting permission for data transmission; said control station also including means for sending out on said data highway a selection frame for selecting one transmitting station among said requesting data transmitting/receiving stations and for specifying one receiving station among said transmitting/receiving stations based on a received request frame; said transmitting/receiving stations also having means for sending out on said data highway a data frame including data transmitted from said transmitting station to said receiving station, a response frame from said receiving station after reception of data and an end frame from said transmitting station for informing said control station of completion of said transmission cycle.

* * * * *